Figure 1:
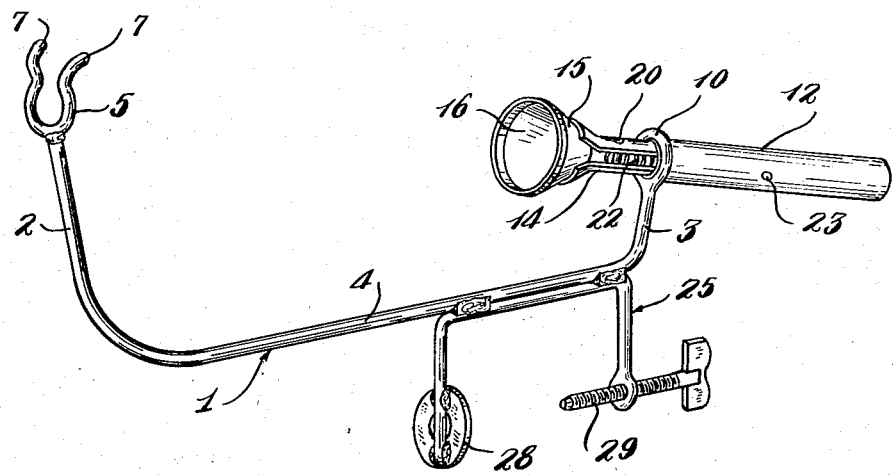

Nov. 2, 1954   J. F. ALBERT   2,693,332
FISHING ROD HOLDER
Filed April 13, 1951

INVENTOR.
JOHN F. ALBERT
BY West & Oldham
ATTORNEYS

United States Patent Office 2,693,332
Patented Nov. 2, 1954

2,693,332

FISHING ROD HOLDER

John F. Albert, Cleveland, Ohio, assignor to Emilia T. Albert, Cleveland, Ohio

Application April 13, 1951, Serial No. 220,850

1 Claim. (Cl. 248—42)

This invention relates, generally, to fishermen's equipment, and more particularly to a device or holder for supporting a fishing rod in a position for fishing.

The primary object of the invention is to provide a device that may be conveniently attached to the side of a boat or other support, and into which the handle portion of a fishing rod may be easily and quickly inserted while grasped by the hand in the usual manner, and from which the rod may be removed with equal facility.

Another object of the invention is to provide a device of the aforesaid character by which the rod is securely held against accidental dislodgement.

Another object is to provide a fishing rod holder that is relatively simple and substantial of construction and economical of production.

A further object of the invention is to provide a fishing rod holder that is adapted to receive and properly support fishing rods having handles of different lengths, diameters and styles; and that may be mounted upon supports of different shapes and thicknesses.

Other objects and advantages will appear as I proceed to describe the invention in detail in connection with the accompanying drawing wherein like reference characters designate like parts in the different views.

Figure 2:
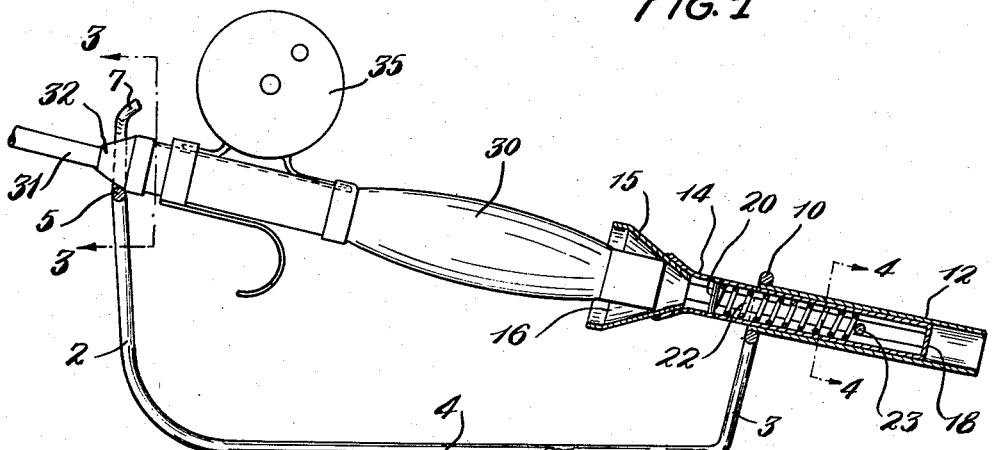
Figure 3:
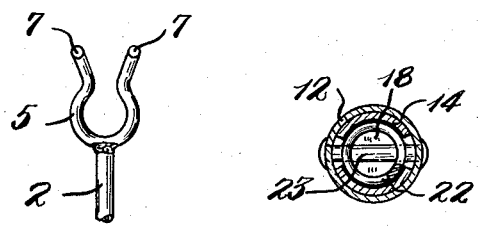
Figure 4:
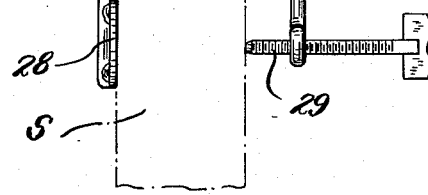

In the drawing, Fig. 1 is a perspective view of a fishing rod holder constructed in accordance with my invention; Fig. 2 is a side-elevational view, partly in section, of the holder showing a fishing rod supported therein; Fig. 3 is a detail of the holder as viewed from the line 3—3 of Fig. 2; and Fig. 4 is a section on the line 4—4 of Fig. 2, drawn to a larger scale.

According to the present preferred embodiment of the invention, the holder includes a relatively wide, generally U-shaped frame designated 1. This frame is constructed of rod of suitable gauge and comprises end branches 2 and 3 that are connected by a central portion 4. The frame is desirably deeper adjacent the branch 2 than it is adjacent the branch 3, for a purpose that will presently appear. The branch 2 mounts a fork 5, shown as constructed of heavy, stiff wire, and the prongs of the fork are shaped to define a notch that is enlarged at its inner end, where it is preferably circular, as best shown in Fig. 3. Outwardly of the enlarged portion of the notch, the prongs of the fork 5 diverge, and their terminal portions are deflected inwardly with respect to frame 1. The inturned ends of the prongs are designated 7.

The branch 3 of the frame 1 terminates in an eye 10 within the opening of which is secured, as by welding, the inner end of a cylindrical tubular guide 12. Reciprocable within the guide 12 is a plunger 14, having, at its inner end, a receptacle in the form of a head 15 that encloses an outwardly enlarging socket 16.

The plunger 14 and head 15 are preferably fabricated of strap metal and sheet metal, respectively. The plunger is shown as constructed of a continuous piece of strap metal that is shaped to provide an end wall 18, and opposed substantially parallel portions that are curved transversely to conform substantially to the inner cylindrical surface of the guide 12. Except at its inner end, where it is cylindrical, the head 15 is frusto conical; and the inner end of the plunger is welded or otherwise secured to the smaller end of the head. An abutment 20 is provided by a cross-pin that is supported by and extends between the sides of the plunger and a compression spring 22 is confined between the abutment 20 and a pin 23 that extends through the plunger and through diametrically opposed holes in the guide 12.

The device includes a C-clamp that is designated, generally, by the reference numeral 25, by which it is aadpted to be secured to a suitable support S, shown in dot-and-dash lines in Fig. 2. This support may consist of the side of a boat, for example.

The frame of the C-clamp 25 is welded or otherwise secured to the portion 4 of the frame 1, and the clamp incorporates a bearing plate 28, and the usual clamping screw 29.

With the device or holder attached by means of the clamp 25 to the side of a boat or other support, a fisherman, when he desires to "set" his rod for fishing, or when he has occasion to use both hands for other purposes, inserts the inner end of the handle 30 within the socket 16 of the head 15 and pushes the plunger 14 further into the guide 12 so that the opposite end of the handle may be swung downwardly to engage the adjacent portion of the rod 31 in the notch of the fork 5. Now, upon releasing rearward pressure on the handle, the spring 22 will expand and project the plunger in a direction to force the tapered end 32 of the handle into the enlarged inner end of the notch of the fork 5. With the parts in this condition, the rod will be firmly supported in the holder. Obviously, by reversing the foregoing operation, the rod may be removed from the holder.

The frame 1 is made deeper adjacent the end branch 2 to allow clearance for the reel 35, in case the reel is mounted on the underside of the rod or the rod turned to dispose the reel below it when placing the rod in the holder.

Handles of fishing rods differ in length, diameter, and style, within certain limits, and my holder is designed to accommodate practically all handles. By making the socket 16 of the head 15 outwardly flaring, the inner ends of most handles will be accommodated; and it is to be noted that the outer end of the wall of the socket is substantially cylindrical to better resist accidental disengagement of the handle from the head in case a lateral thrust is imposed on the handle, such as might result from a heavy tug on the line.

The outer ends of some handles are larger in diameter than the one shown in the drawing, and they join the rod in an abrupt shoulder so that no part of the handle will project into the notch of the fork 5. In such cases, the inturned upper ends 7 of the prongs of the fork 5 overhang the adjacent end of the handle and prevent the rod from being accidentally dislodged from the fork.

Having thus described my invention, what I claim is:

In a fishing rod holder, a fork comprising prongs shaped to define a notch that is enlarged at its inner end, a tubular guide, a frame supporting said fork and guide in spaced relation to each other with the guide in substantially axial alignment with the enlarged inner end of said notch, a plunger reciprocable within said guide, said plunger being fabricated of a continuous strap of metal that is shaped to provide opposed substantially parallel side portions and an end wall, a head secured to the end of the plunger remote from said end wall, the head having a socket adapted to receive the inner end of a fishing rod handle so that the opposite end of the handle is in a position to occupy the enlarged end of said notch, a pin carried by the guide and extending substantially diametrically thereof through the slot in the plunger defined by said parallel side portions of the strap whereof the plunger is fabricated, the plunger incorporating an abutment adjacent said head, and a compression spring disposed within the plunger and confined between said abutment and the aforesaid pin.

References Cited in the file of this patent

UNITED STATES PATENTS

| Number | Name | Date |
|---|---|---|
| 515,849 | Wheeler | Mar. 6, 1894 |
| 1,035,739 | Raes | Aug. 13, 1912 |
| 1,229,431 | Farrell | June 12, 1917 |
| 1,891,163 | Kabele | Dec. 13, 1932 |
| 2,236,070 | Rohrdanz | Mar. 25, 1941 |
| 2,414,358 | Calway | Jan. 14, 1947 |
| 2,454,458 | Kaetker | Nov. 23, 1948 |
| 2,502,272 | Patton | Mar. 28, 1950 |
| 2,576,212 | Carter | Nov. 27, 1951 |
| 2,598,021 | Schwanke | May 27, 1952 |